(12) United States Patent
Kita et al.

(10) Patent No.: US 7,687,739 B2
(45) Date of Patent: Mar. 30, 2010

(54) SEAL STRUCTURE FOR A WIRE-CUT ELECTRIC DISCHARGE MACHINE

(75) Inventors: Yuki Kita, Yamanashi (JP); Shinji Okuda, Yamanashi (JP); Hikaru Yamane, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 518 days.

(21) Appl. No.: 11/409,053

(22) Filed: Apr. 24, 2006

(65) Prior Publication Data

US 2006/0237915 A1 Oct. 26, 2006

(30) Foreign Application Priority Data

Apr. 25, 2005 (JP) ............... 2005-126092

(51) Int. Cl.
*B23H 7/02* (2006.01)
*F16J 9/00* (2006.01)

(52) U.S. Cl. .................. 219/69.12; 219/69.14; 277/435

(58) Field of Classification Search ............. 219/69.12, 219/69.14; 277/361, 364, 347, 353, 355, 277/360, 435, 634, 906
See application file for complete search history.

(56) References Cited

U.S. PATENT DOCUMENTS

| | | | | |
|---|---|---|---|---|
| 822,302 | A * | 6/1906 | Wilkinson | 277/428 |
| 3,765,688 | A * | 10/1973 | Junker | 277/428 |
| 4,426,088 | A * | 1/1984 | Ernst | 277/347 |
| 4,440,401 | A * | 4/1984 | Olschewski et al. | 277/353 |
| 4,565,915 | A * | 1/1986 | Girardin | 219/69.12 |
| 4,664,391 | A * | 5/1987 | Barra | 277/411 |
| 4,972,986 | A * | 11/1990 | Lipschitz | 277/361 |
| 5,111,016 | A | 5/1992 | Lodetti et al. | |
| 5,312,140 | A * | 5/1994 | Pollack | 277/364 |
| 6,474,652 | B1 * | 11/2002 | Hosoya et al. | 277/361 |
| 6,831,245 | B1 * | 12/2004 | Koba et al. | 219/69.12 |
| 6,942,219 | B2 * | 9/2005 | Khonsari et al. | 277/360 |
| 2003/0085525 | A1 * | 5/2003 | Boston | 277/355 |

FOREIGN PATENT DOCUMENTS

| | | |
|---|---|---|
| EP | 0133160 | 2/1985 |
| EP | 0610974 | 8/1994 |
| JP | 4-159023 A * | 6/1992 |
| JP | 4-275824 A * | 10/1992 |
| JP | 11-129120 A * | 5/1999 |
| JP | 11129120 | 5/1999 |
| JP | 3026120 | 1/2000 |
| JP | 2000-301415 A * | 10/2000 |

OTHER PUBLICATIONS

European Search Report issued Dec. 20, 2006 in corresponding European application No. 06252188.5.

* cited by examiner

*Primary Examiner*—Geoffrey S Evans
(74) *Attorney, Agent, or Firm*—Staas & Halsey LLP

(57) ABSTRACT

A seal structure channels drainage of machining fluid from the periphery of an opening for a lower arm of a wire-cut electric discharge machine. The seal structure restricts flowage to the outside of machining fluid through the opening (slot) in a side of a machining tank and has a first seal and a second seal (a seal plate) affixed to the first seal so as to cover the opening. An unevenly shaped part including ridges and grooves extending in the long direction of the first seal is formed on the first seal, and passages are provided that communicate with the groove and the outside to channel the machining fluid drainage path. The first seal may be composed of a plurality of members. A suction device sucks up machining fluid draining from the passages.

7 Claims, 8 Drawing Sheets

SEAL STRUCTURE FOR A WIRE-CUT ELECTRIC DISCHARGE MACHINE

BACKGROUND OF THE INVENTION

1. Field of the Invention

The present invention relates to a seal structure for a wire-cut electric discharge machine, and more particularly to a seal structure that restricts flowage to the outside of machining fluid from an opening in a side wall of a machining tank that permits the passage of a lower arm therethrough.

2. Description of the Related Art

As is well known, in a wire-cut electric discharge machine, machining is carried out by supporting a wire electrode between upper and lower arms and causing an electric discharge between a workpiece and the wire electrode, in a state in which the workpiece is immersed in machining fluid. The machining fluid is contained in a machining tank, and an opening that permits the passage of the lower arm is provided in a side surface of the machining tank. In order to prevent the loss of machining fluid to the outside through this opening, a seal structure that restricts the flowage of machining fluid through the opening to the outside is provided around the opening.

FIG. 1 is a diagram illustrating the typical basic construction of this seal structure, with a periphery of the opening for the lower arm shown in a sectional view. Also depicted in FIG. 1 is a coordinate system for describing directions of movement. The +Z direction of this coordinate system corresponds to the vertical direction, and the XY plane corresponds to a horizontal plane perpendicular to the pull of gravity. It should be noted that descriptions of directions in terms of the aforementioned coordinate system is also used for convenience with respect to other drawings as well.

In FIG. 1, reference numeral 1 indicates a machining tank, in a side part of which is provided an opening 2 for the passage of a lower arm 10 therethrough as indicated by the dotted line, with a small amount of room to spare. This small amount of play permits simultaneous movement of the lower arm 10 in the ±X direction and the ±Y direction when moving a workpiece relative to the wire electrode (neither of which is shown) in the ±X direction and the ±Y direction. If some sort of seal structure is not provided at this opening 2, the machining fluid inside the machining tank (consisting mainly of water or oil and the like) will drain to the outside.

Accordingly, as shown in FIG. 1, a seal structure is provided that uses a seal 3 (first seal means) and a seal plate 4 (second seal means). The seal 3 (first seal means) is provided on the periphery of the opening 2 and the seal plate 4 (second seal means) is pressed against the seal 3 so as to cover the opening 2. In addition, a hole 41 that allows the lower arm 10 to pass through is formed in substantially the center of the seal plate 4 (second seal means). It should be noted that, although not directly related to the present invention, a well-known seal unit (for example, a bellow-shaped seal) 42 is provided also at the hole 41, permitting the lower arm 10 to pass in and out while doing its best to prevent leakage of machining fluid from a gap between the outer periphery of the lower arm 10 and the inner wall of the hole 41.

Thus, as described above, the seal plate 4 permits unrivalled movement of the lower arm 10 in the ±Y direction. However, the seal plate 4 cannot but hamper movement of the lower arm 10 in the ±X direction. Consequently, the seal plate 4 is pressed against the seal 3 using a suitable affixing means (for example, something that uses a spring member) while supporting the plate 4 in that affixed state in such a way as to enable the seal plate 4 to slide in the ±X direction. In addition, the length of the seal plate 4 in the ±X direction is designed to be sufficiently longer than the length of the opening (slot) 2 in the ±X direction so as to keep both edges of the seal plate 4 in the ±X direction from separating from the seal 3 while the seal plate 4 slides in the ±X direction.

The problem with this sort of seal structure is leakage of the machining fluid from between the seal plate 4 and the seal 3. The amount of leakage can be reduced if the force of attachment of the affixing means 5 is very great, thus pressing the seal plate 4 hard against the seal 3. However, doing so increases the frictional force acting between the seal plate 4 and the seal 3 and prevents the seal plate 4 from sliding smoothly.

The conventional solution to this problem is to form a so-called labyrinth seal structure where the seal 3 contacts the seal plate 4 so as to reduce the amount of leakage of machining fluid.

FIG. 2 is a plan view of the basic form of the seal 3 employed conventionally, as seen from the ±Y direction in FIG. 1. As shown in FIG. 2, an unevenly shaped part composed of two ridges and one groove is provided on the side where the seal 3 contacts the seal plate 4 (see FIG. 1) so as to form a labyrinth structure for suppressing machining fluid leakage. The entire seal 3 is shaped like a frame along the periphery of the opening 2 (see FIG. 1), with reference numerals 31a-31d indicating top, bottom, left and right grooves, respectively, as seen from the +Y direction. As for the two ridges, an inner ridge is indicated by reference numeral 32a and an outer ridge is indicated by reference numeral 32b.

Although it is true that using a seal 3 of such a construction can reduce the amount of leakage of the machining fluid to some extent, as a practical matter, it is virtually impossible to eliminate completely the leakage of machining fluid using such a seal structure. Consequently, a certain amount of flowage of machining fluid to the outside of the machining tank is considered inevitable, and therefore efforts to alleviate this problem are currently limited to providing means for recovering the machining fluid that thus drains away.

Here, with respect to where the leakage of machining fluid occurs, in general, it may be thought that the greatest leakage would likely occur at the bottom (the −Z side), where the pressure head is greatest. In reality, however, experience shows that, as shown by the numerous arrows 6 shown in FIG. 2, leaks can occur on all sides. Particularly when machining fluid leaks from the top and the sides, it sometimes develops into a leak in which the machining fluid creeps along the seal plate 4 (see FIG. 1) to the outside of the machine itself. If such a machining fluid leakage outside the machine occurs, it can degrade the surrounding environment and require that the machine be shut down.

Such a problem is difficult to solve using the unevenly shaped labyrinth seal structure like that disclosed for example in JP 3026120B for the seal. In addition, although a conventional technique of providing a wiper-like member on the sides of the seal unit to prevent leakage to the outside the machine in order to prevent machining fluid leakage from the top and the sides of the seal and along the seal plate 4 from leaking outside of the machine, is well known, such an arrangement has the disadvantage that the structure of the seal unit becomes complicated, inviting an increase in cost.

Thus, as described above, with existing seal structures the leakage from the seal unit is not consistent or cannot be identified, and therefore a complicated or large-scale collection structure that must be able to cope with leaks from all locations on the seal unit is required to collect the machining fluid that leaks from the machining tank.

SUMMARY OF THE INVENTION

The present invention provides a seal structure capable of controlling the routes of leakage of machining fluid from the machining tank so as to facilitate countermeasure of machining fluid leakage from the machine. In addition, by enabling the machining fluid collection structure to be simplified, the present invention improves the reliability of the wire-cut electric discharge machine by inexpensive means.

A seal structure of the present invention is provided for sealing an opening formed at a side wall of a machining tank of a wire-cut electric discharge machine in which an upper arm and a lower arm support a wire electrode in between and the lower arm extends through the opening into the machining tank containing machining fluid. The seal structure comprises: first seal means provided along a periphery of the opening; and second seal means having a hole through which the lower arm extends and pressed against the first seal means to be in contact with the first seal means to cover the opening, the first seal means having two or more ridges and one or more grooves between the ridges along an extending direction thereof on a side in contact with the second seal means, and one or more passages communicating at least one of the grooves and exterior of the first seal means.

The passages may be arranged along a lower portion of the periphery of the opening.

The first seal means may be composed of a plurality of members.

The passages may be provided by notches formed in one of the ridges. The passages may be provided by through holes formed in one of the ridges. Further, the passages may be provided by through holes extending from one of the grooves to the exterior of the first seal means without passing through the ridges. The passages may be connected to suction means for sucking the machining fluid drained through the passages.

Unlike existing seal structures, the present invention enables the locations of leakage to be identified and localized, thus facilitating collection of machining fluid draining from the machining tank to be collected without leaking to the outside of the machine. Moreover, the foregoing arrangement enables the present invention to improve the reliability of the wire-cut electric discharge machine without inviting a cost increase.

DETAILED DESCRIPTION

A detailed description will now be given of embodiments and variations of the present invention, with reference to the accompanying drawings. It should be noted that, except for the difference in seals employed, the basic construction of the seal structure shown in FIG. 1 can be employed in all cases described below, and accordingly, a description of the basic construction of the seal structure shown in FIG. 1 is not repeated.

Figure 1:
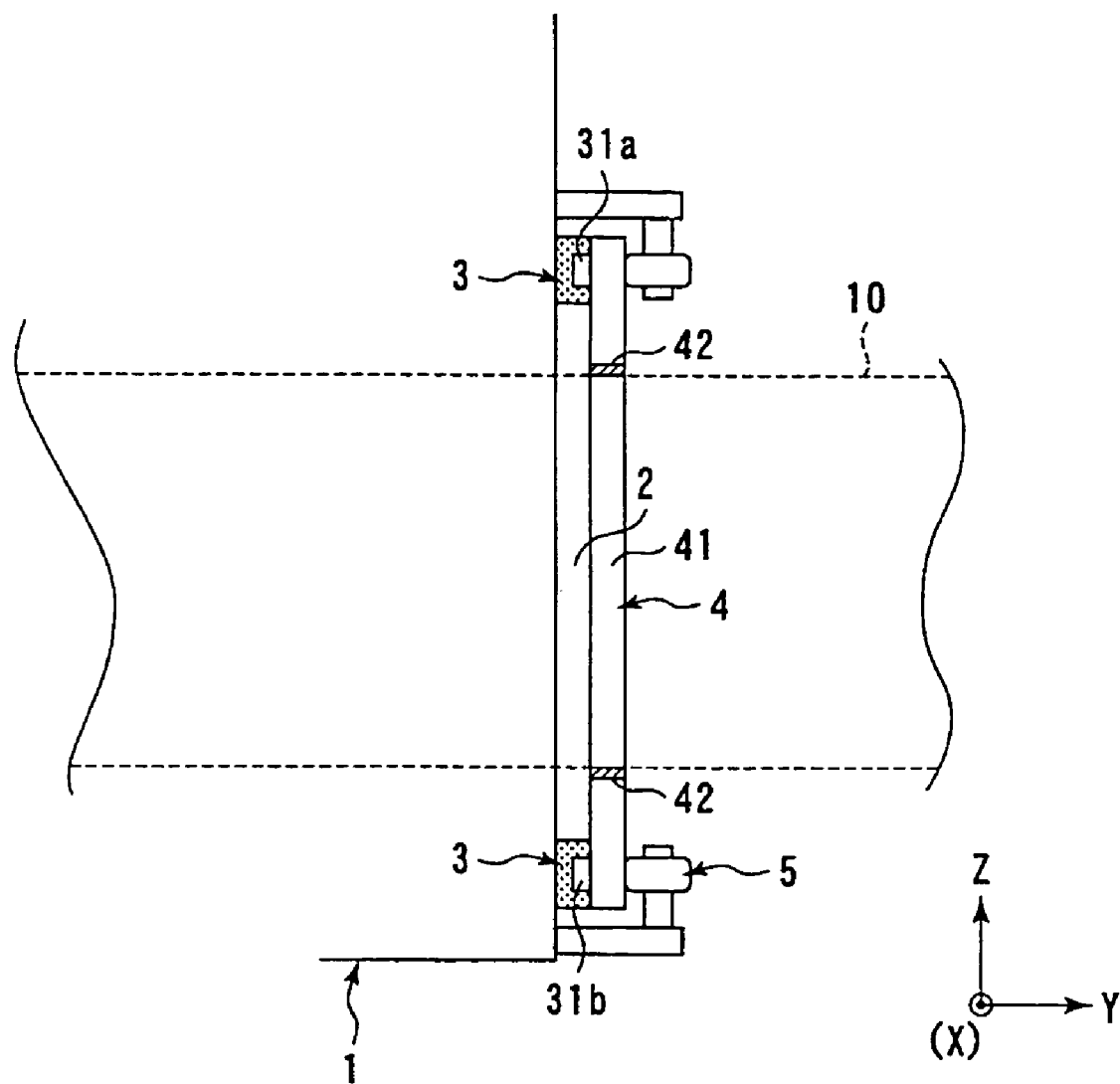
FIG. 1 is a diagram illustrating the basic construction typical of a seal structure, showing a sectional view of the area around an opening through which a lower arm passes.
Figure 2:
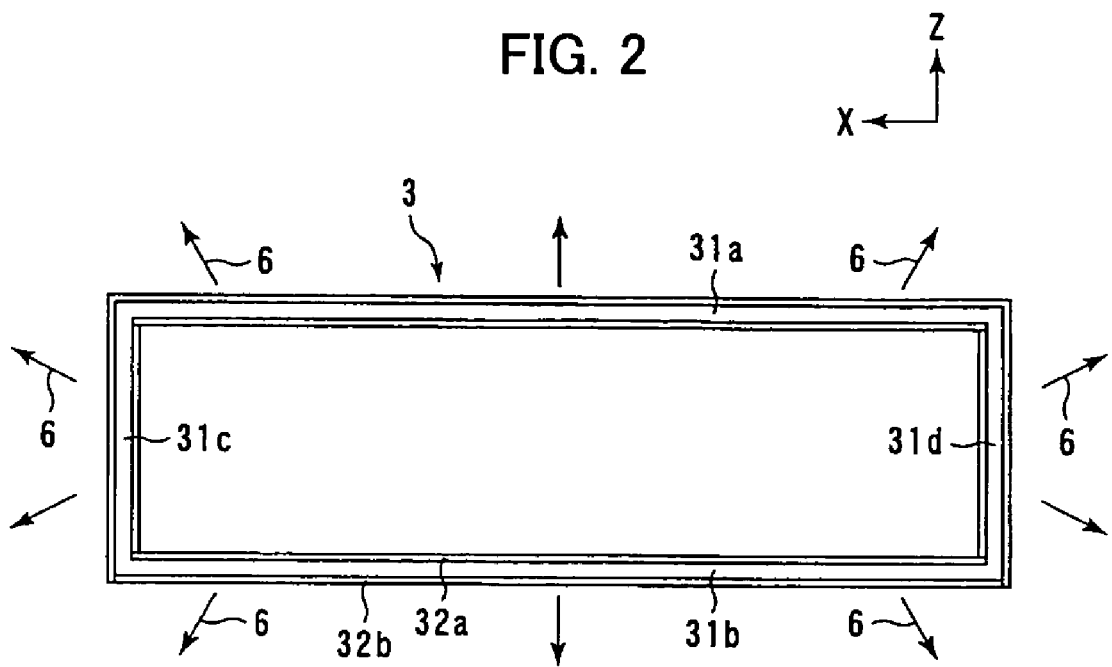
FIG. 2 is a diagram showing a plan view of the basic form of the seal employed conventionally, as seen from a +Y direction shown in FIG. 1.
Figure 3:
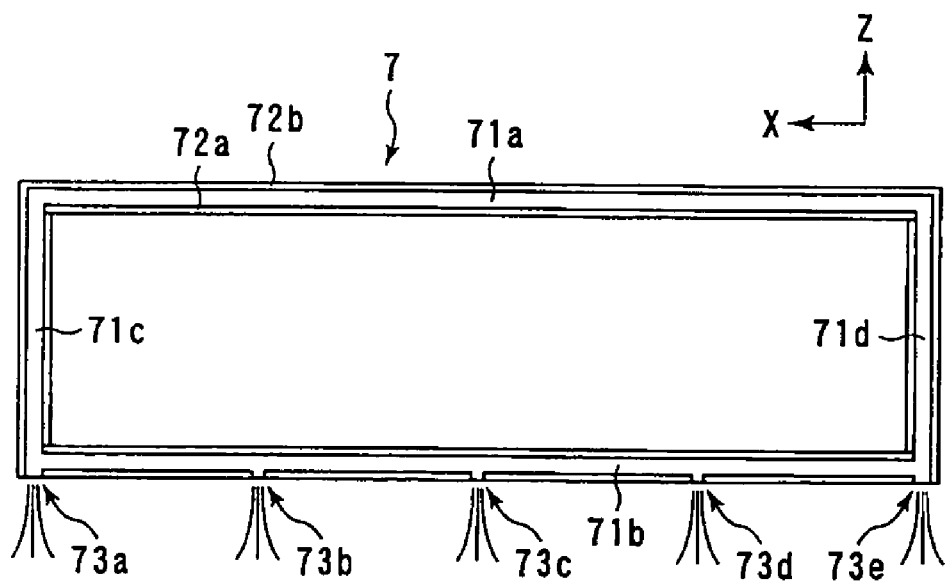
FIG. 3 is a diagram showing a plan view of a seal employed in a first embodiment of the present invention, as seen from a +Y direction shown in FIG. 1.
Figure 4A:
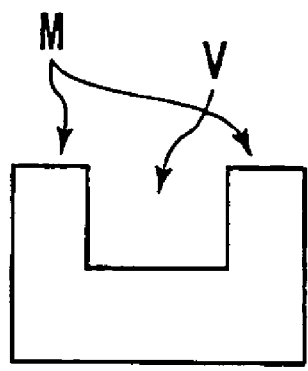
FIGS. 4a-4d are diagrams showing sectional views of the basic form, a first variation, a second variation and a third variation of the seal, respectively.
Figure 4B:
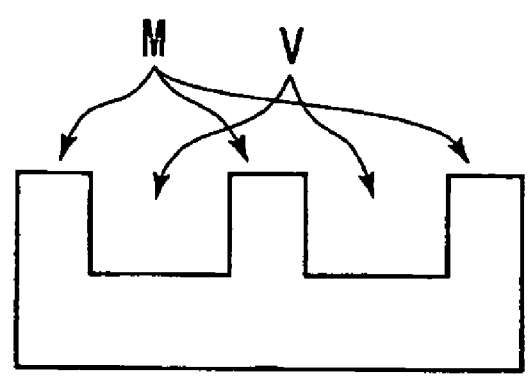
Figure 4C:
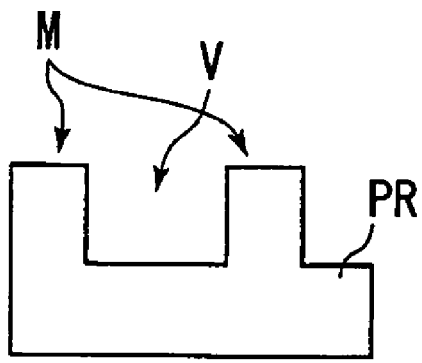
Figure 4D:
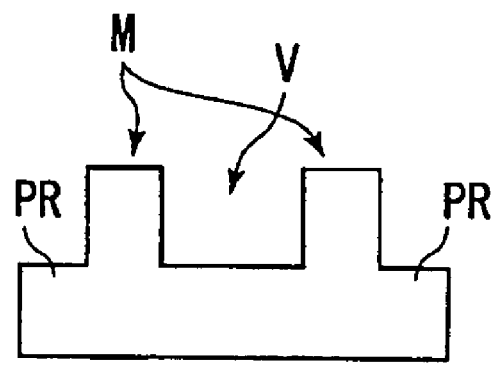

First, in a typical embodiment, a structure is employed in which a first seal means (that is, seal 3) employed in the structure shown in FIG. 1 is substituted for a seal 7 shown in FIG. 3. In FIG. 3, as in FIG. 2, the seal (first seal means) 7 is shown in plan view, as seen from the +Y direction shown in FIG. 1. As shown in FIG. 3, as with seal 3, an unevenly shaped part composed of two ridges and one groove is formed in a side of the seal 7 that contacts the seal plate 4 (see FIG. 1)

In addition, that the seal 7 has a frame-like shape around the periphery of an opening 2 (see FIG. 1) is also the same as in the case of seal 3. In FIG. 3, top, bottom left and right portions as seen from the +Y direction are indicated by reference numerals 71a-71d, respectively. An inner ridge is indicated by reference numeral 72a and an outer ridge is indicated by reference numeral 72b. Thus, the seal 7 employed in the present embodiment, although it shares the same skeletal structure with the seal 3 used conventionally, nevertheless clearly differs from the latter in that passages are formed in the groove that communicate with the outside of a machining tank 1 (see FIG. 1).

These passages actively provide drainage paths for the machining fluid from the machining tank 1 to the outside, by which the machining fluid flowage locations are localized. The number and location of the passages can be determined as a matter of design choice, but typically, as shown in the diagram, a number of passages (in this case, five) 73a-73e are formed along the bottom groove 71b at substantially equal intervals. Providing such passages makes the possibility of the machining fluid draining from locations other than the passages extremely low, because, upon examining the entire circumference of the frame-like seal 7, as between the portions where passages 73a-73e exist and portions where they do not exist, the difference in resistance encountered when the machining fluid attempts to escape from the groove to the outside along these portions is very great, and there can be no doubt that machining fluid flowage occurs first through the passages 73a-73e, where only slight resistance is encountered.

It should be noted that passages identical to those of the present embodiment can also be formed in any given seal (first seal means) having an unevenly shaped part composed of two or more ridges and one or more grooves between the ridges disposed on the seal plate side, and employing same in place of the seal 3 described above results in a different embodiment of the present invention. Thus, FIGS. 4a-4d are diagrams showing sectional views of the basic form, a first variation, a second variation and a third variation of the seal, respectively. In these diagrams, reference symbols M, V denote ridges and grooves, respectively, and reference symbol PR denotes projections toward the top or the bottom. Shown in FIG. 3 is the basic form shown in FIG. 4a. Preferably, when there are two (or more) grooves V as in the variation shown in FIG. 4b, the passages are formed so as to communicate between the outermost groove (the one on the side furthest from the lower arm) and the outside. However, at a minimum, all that is required is that the passages be provided so that at least one of one or more (that is, one or multiple) grooves thus formed communicates with the outside. Moreover, where a plurality of grooves is formed, passages may be provided that connect one groove (for example, the groove that communicates with the outside) to another groove.

Figure 5A:
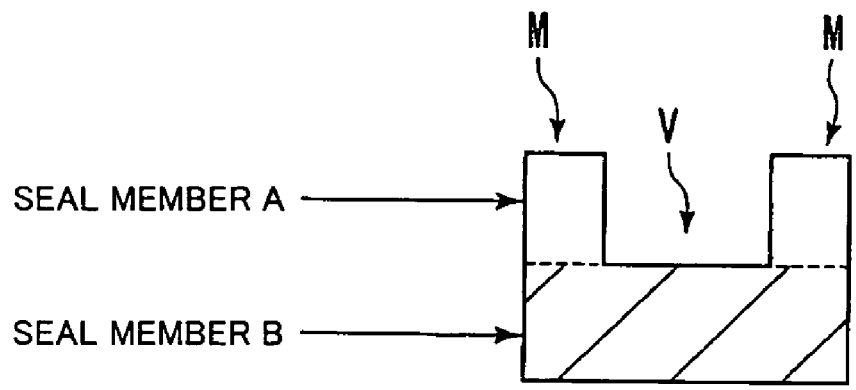
FIGS. 5a-5c are diagrams showing first, second and third examples of a seal composed of a plurality of members (here, two)
Figure 5B:
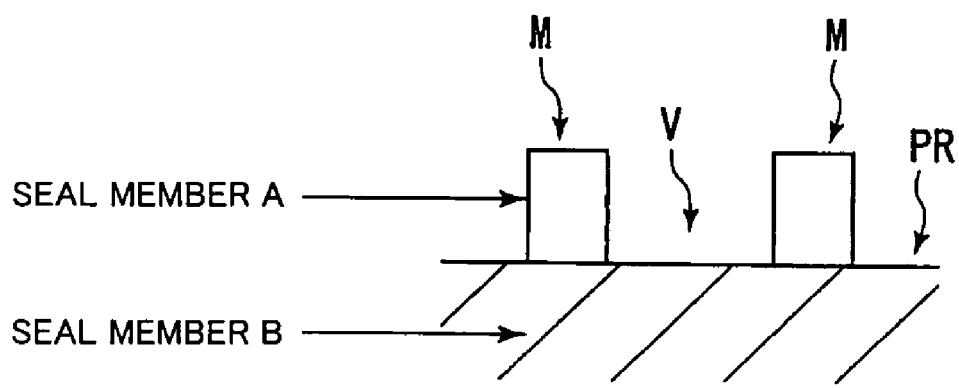
Figure 5C:
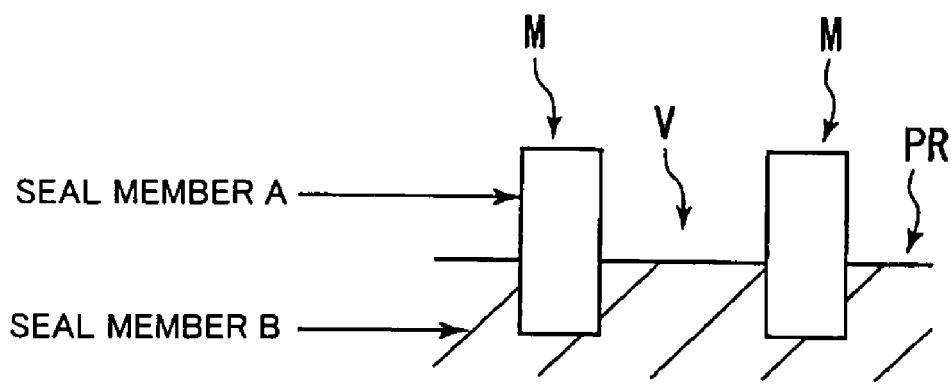

In addition, it is not necessary that the seal employed in the present invention be composed of a single member, and alternatively, as shown in FIGS. 5a-5c, the seal may be composed of a plurality of members (in this case, two). Of these examples, in those shown in FIGS. 5a and 5b, member A is used to form the ridges and member B is used to form the remaining portions. In FIG. 5b, member B is also used to form a projecting part PR. In FIG. 5c, member A is imbedded in member B to form the ridges M and the groove V. In all these examples, member A and member B are joined together. Any well-known means can be used for the joining means (for example, adhesive, screws, and so forth).

Figure 6A:
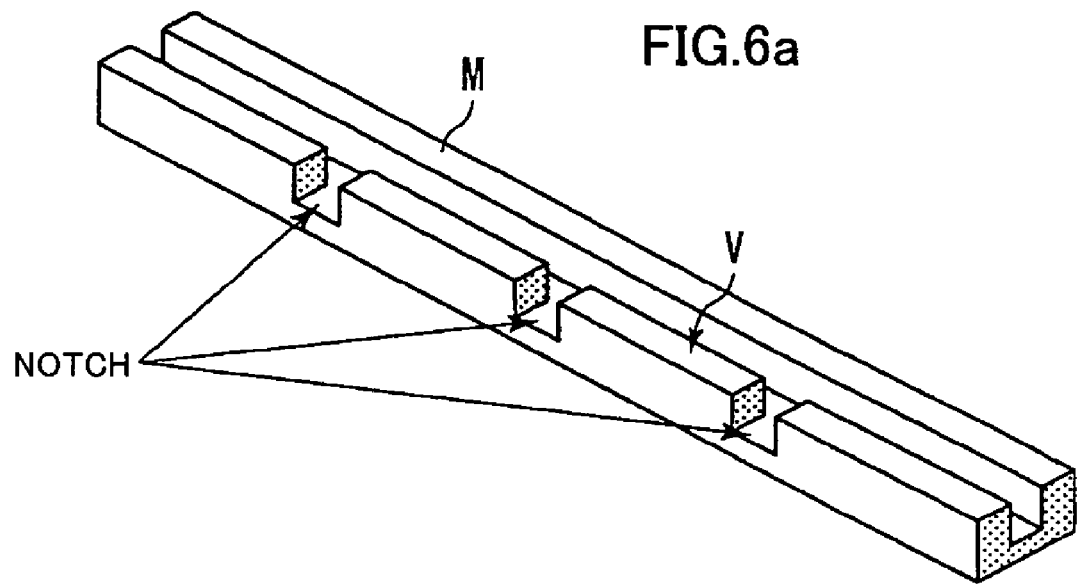
FIGS. 6a and 6b are diagrams showing examples of a seal in which machining fluid drainage passages are formed by notches formed in a ridge and an example of a seal in which the machining fluid drainage passages are provided by through-holes formed in the ridge.
Figure 6B:
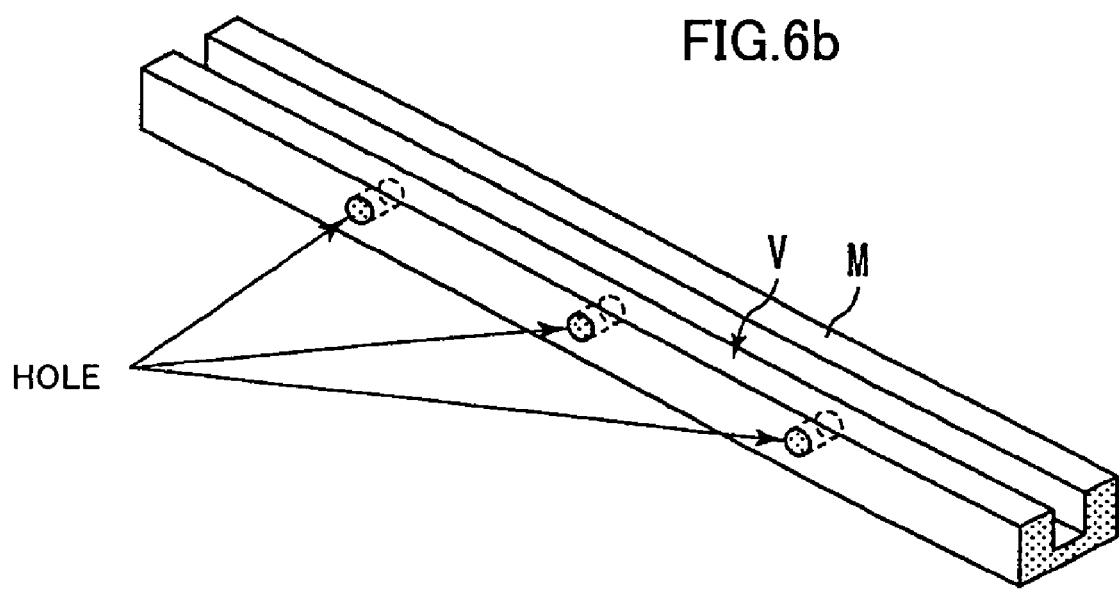
Figure 7:
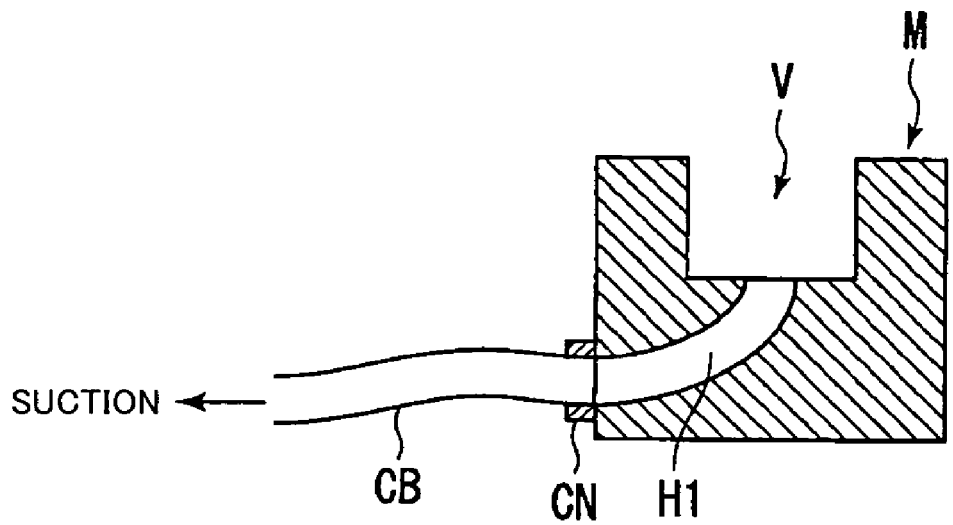
FIG. 7 is a diagram showing an example of another form of the machining fluid drainage passages and the use of a suction means, in which curved through-holes are formed from the bottom of a groove to the outside of the seal without passing through the ridge, with the suction means connected to the discharge end of the through-holes.
Figure 8:
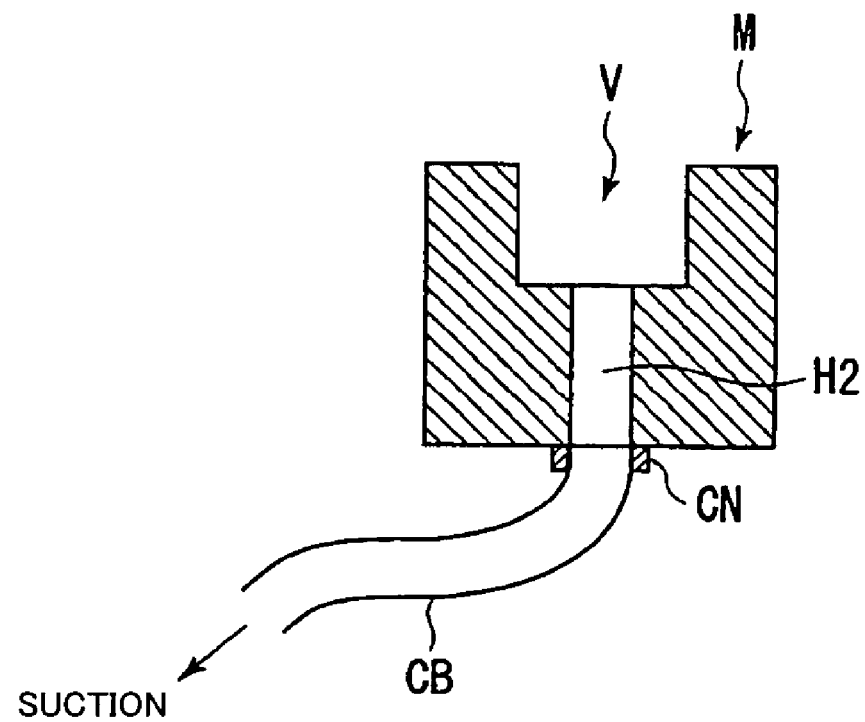
FIG. 8 is a diagram showing an example of another and further form of the machining fluid drainage passages and the use of the suction means, in which straight through-holes are formed from the bottom of the groove to the outside of the seal without passing through the ridge, with the suction means connected to the discharge end of the through-holes.

The passages that connect the groove and the outside may be provided by notches like those shown in FIG. 6a, or by through-holes provided in the ridge like those shown in FIG. 6b. In addition, the forms shown in FIG. 6a and FIG. 6b may be combined, so that some of the passages are formed as notches and the remaining passages are formed as through-holes in the ridge. Further, where the groove is made to communicates with the outside by through-holes, it is also possible to bypass the intervening ridge. Moreover, suction means may be connected to the through-holes to collect the machining fluid. FIG. 7 and FIG. 8 show examples of such an arrangement.

First, in the example shown in FIG. 7, curved through-holes H1 are formed from the bottom of the groove to the outside without passing through the ridge M and a pipe (tubing) CB is connected to the discharge end of the through-holes H1 using a connector CN.

In addition, FIG. 8 shows an example in which straight through-holes H2 are formed from the bottom of the groove to the outside without passing through the ridge M and a pipe (tubing) CB is connected to the discharge end of the through-hole H1 using a connector CN. This sort of connection of a suction means may be carried out in all the examples described above and not just the examples shown in FIG. 7 and FIG. 8. Particularly in cases in which the locations where the passages that communicate between the groove and the outside are formed are not along that portion which follows the lower periphery of the machining tank 1 as shown in FIG. 3 but are instead the sides (for example, connecting grooves 71c, 71d and the outside) or the top (for example, connecting groove 71a and the outside), connection of the suction means is effective in securely collecting drained machining fluid. However, in principle, the passages are formed along the lower periphery of the machining tank 1 as shown in FIG. 3, and it goes without saying that it is preferable to avoid other locations.

Figure 9:
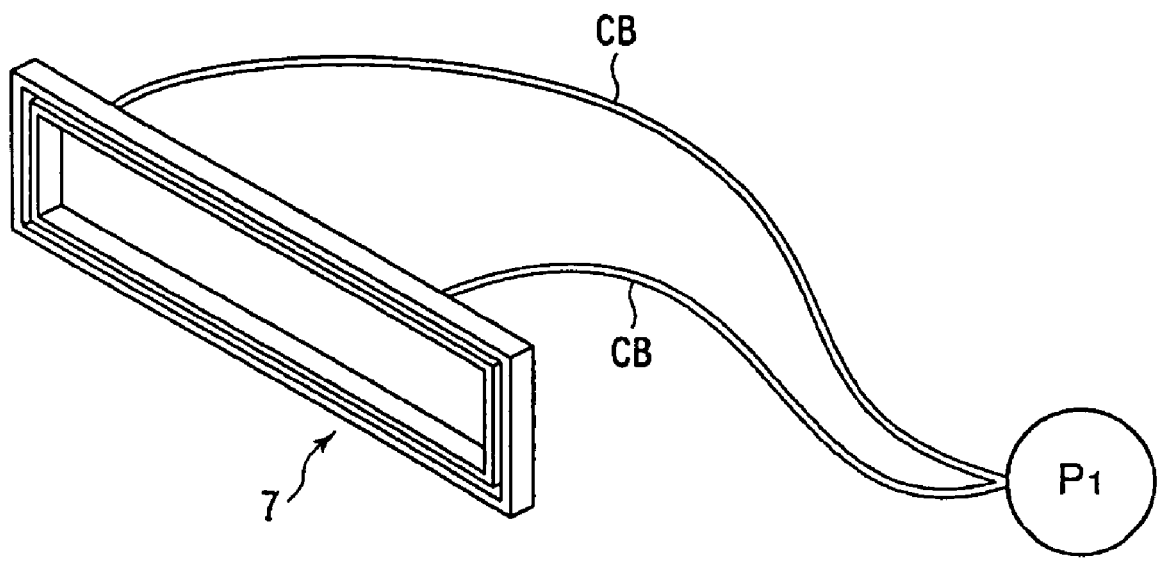
FIG. 9 is a diagram showing an example in which a newly provided pump is used to suck up the machining fluid.
Figure 10:
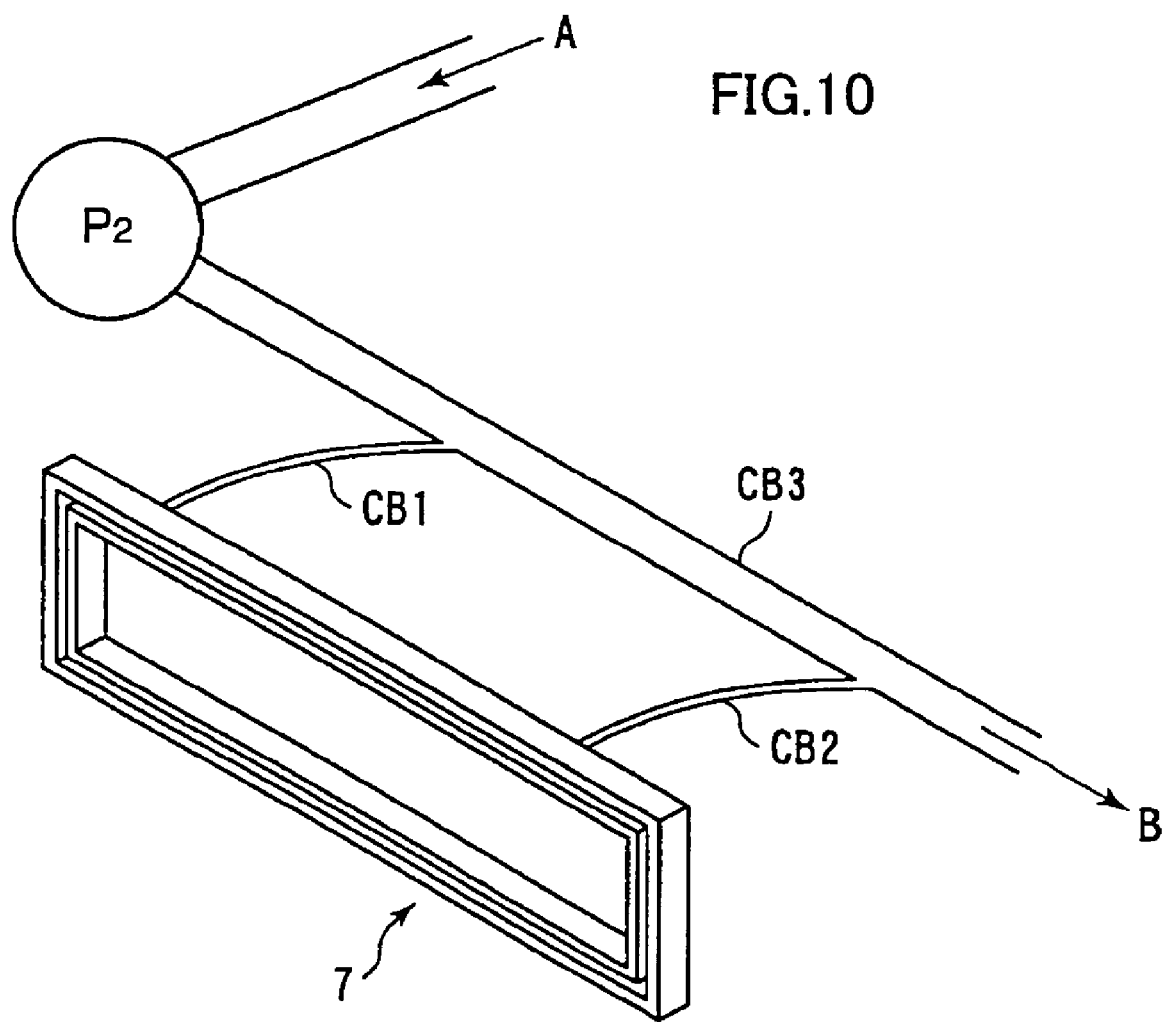
FIG. 10 is a diagram showing an example in which the discharge-side flow of an existing pump is used to suck up the machining fluid.

FIG. 9 and FIG. 10 show examples of the suction means for sucking up the machining fluid. In the example shown in FIG. 9, a newly provided pump P1 for sucking up the machining fluid is utilized, with the tubing or pipe CB (two are shown in this example) connected to the discharge ends of the passages also connected to the intake side of the pump P1. A pipe, not shown, on the discharge side of the pump P1 empties, for example, above the machining tank, and the machining fluid collected by the pump P1 is returned to the machining tank.

FIG. 10 is a diagram showing an example in which the discharge-side flow of an existing pump is used to suck up the machining fluid. In the diagram, a pump indicated by reference symbol P2 is a pump originally provided as part of the wire-cut electric discharge machine, whose intake side A, for example, sucks up clean water (clean machining fluid) from a clean water tank, and whose discharge side leads to a machining tank through a thick pipe (tubing or the like) CB3. In this case, a comparatively fast flow is always present inside the thick pipe CB3. Therefore, if the tubing or pipe (two are shown in this example) CB1 and CB2 connected to the discharge ports of the passages are also connected to the pipe CB3 on the discharge side of the pump P2 at an angle confluent with the flow inside the pipe CB3 (a small intersecting angle of, for example, approximately 20 degrees) as shown in FIG. 10, the suction created by the comparatively fast flow inside CB3 acts on the machining fluid inside pipes CB1 and CB2 so as to return the machining fluid thus collected to the machining tank through pipe CB3.

What is claimed is:

1. A seal structure sealing an opening formed at a side wall of a machining tank of a wire-cut electric discharge machine in which an upper arm and a lower arm support a wire electrode, and the lower arm extends through the opening into the machining tank containing machining fluid, said seal structure comprising:
    a first seal provided along a periphery of said opening; and
    a second seal having a hole through which the lower arm extends and pressed against said first seal to be in contact with said first seal to cover said opening,
    said first seal having two or more ridges and one or more grooves between the ridges along an extending direction thereof on a side in contact with said second seal, and one or more passages extending between at least one of the grooves and the exterior of said first seal, said one or more passages providing drainage paths for the machining fluid to control routes of leakage of the machining fluid outside the machining tank.

2. A seal structure according to claim 1, wherein said passages are arranged along a lower portion of the periphery of said opening.

3. A seal structure according to claim 1, wherein said first seal is composed of a plurality of members.

4. A seal structure according to claim 1, wherein said passages are provided by notches formed in one of the ridges.

5. A seal structure according to claim 1, wherein said passages are provided by through holes formed in one of the ridges.

6. A seal structure according to claim 1, wherein said passages are provided by through holes extending from one of the grooves to the exterior of said first seal without passing through the ridges.

7. A seal structure according to claim 1, wherein said passages are connected to suction means for sucking the machining fluid drained through the passages.

* * * * *

UNITED STATES PATENT AND TRADEMARK OFFICE
CERTIFICATE OF CORRECTION

| | | |
|---|---|---|
| PATENT NO. | : 7,687,739 B2 | Page 1 of 1 |
| APPLICATION NO. | : 11/409053 | |
| DATED | : March 30, 2010 | |
| INVENTOR(S) | : Yuki Kita et al. | |

It is certified that error appears in the above-identified patent and that said Letters Patent is hereby corrected as shown below:

On the Title Page Item (56) (U.S. Patent Documents), Line 1, change "822,302" to --822,802--.

Column 1, Line 66, before "plate" insert --seal--.

Signed and Sealed this

Sixth Day of July, 2010

David J. Kappos
*Director of the United States Patent and Trademark Office*